United States Patent
Waters et al.

(10) Patent No.: US 8,305,270 B2
(45) Date of Patent: Nov. 6, 2012

(54) ANTENNA SELECTION FOR GNSS RECEIVERS

(75) Inventors: Deric Wayne Waters, Dallas, TX (US); Tarkesh Pande, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 191 days.

(21) Appl. No.: 12/767,958

(22) Filed: Apr. 27, 2010

(65) Prior Publication Data

US 2010/0271261 A1    Oct. 28, 2010

Related U.S. Application Data

(60) Provisional application No. 61/179,910, filed on Apr. 27, 2009.

(51) Int. Cl.
  *H01Q 3/12* (2006.01)
  *H01Q 3/00* (2006.01)
(52) U.S. Cl. ........................................ 342/374; 342/372
(58) Field of Classification Search ............. 342/357.77, 342/368, 372, 374; 455/277.1, 277.2
See application file for complete search history.

(56) References Cited

U.S. PATENT DOCUMENTS

| | | | | |
|---|---|---|---|---|
| 5,303,396 A | * | 4/1994 | Ooyagi et al. | 455/134 |
| 5,818,543 A | * | 10/1998 | Lee | 348/725 |
| 8,115,470 B1 | * | 2/2012 | Litovsky | 324/72 |

OTHER PUBLICATIONS

Performance Based Receive Antenna Selection for V-BLAST Systems; Di Lu et al.; IEEE Transactions on Wireless Communications, vol. 8, No. 1, Jan. 2009; pp. 214-225.
A Switching Circuit Scheme for a Satellite Site Diversity System; D. Di Zenobio et al.; ISCAS'88; 1988 IEEE; pp. 119-122.
Predictive Switched Diversity for Slow Speed Mobile Terminals; Markku Tarkiainen et al.; 1997 IEEE; pp. 2042-2044.

* cited by examiner

*Primary Examiner* — Dao Phan
(74) *Attorney, Agent, or Firm* — Steven A. Shaw; W. James Brady; Frederick J. Telecky, Jr.

(57) ABSTRACT

Embodiments of the invention provide a system and method to improve the performance of a GNSS receiver using antenna switching. The system has a plurality of antennas and at least one radio frequency RF chain. There are fewer RF chain(s) than antennas. A receiver processes a plurality of signals sent by a plurality of transmitters. The system also includes antenna switches and switch controller. The method includes processing signals from a plurality of satellite vehicles SVs using an antenna selected from a plurality of antennas.

10 Claims, 7 Drawing Sheets

US 8,305,270 B2

ANTENNA SELECTION FOR GNSS RECEIVERS

CROSS REFERENCE TO RELATED APPLICATIONS

This application claims benefit under 35 U.S.C. §119(e) to U.S. Provisional Application No. 61/172,910. This application is related to U.S. patent application Ser. No. 12/244,060 filed Oct. 2, 2008 entitled POWER-SAVING RECEIVER CIRCUITS, SYSTEMS AND PROCESSES and U.S. patent application Ser. No. 12/648,846 filed Dec. 29, 2009 entitled POSITION AND VELOCITY UNCERTAINTY METRICS IN GNSS RECEIVERS. Said applications are incorporated herein by reference.

BACKGROUND

Embodiments of the invention are directed, in general, to communication systems and, more specifically, methods of antenna switching for GNSS receivers.

As Global Navigation Satellite System (GNSS) receivers become more common, users continue to expect improved performance in increasingly difficult scenarios. GNSS receivers may process signals from one or more satellites from one or more different satellite systems. Currently existing satellite systems include global positioning system (GPS), and the global navigation satellite system (GLONASS). Systems expected to become operational in the near future include Galileo, quazi-zenith satellite system (QZSS), and Beidou.

The future road map for some wireless handsets includes having multiple antennas to support higher data rates. Often, these same handsets also include a GNSS receiver used for position navigation. The presence of multiple antennas presents an opportunity for the GNSS receiver to improve performance by leveraging the diversity gains available from multiple receive antennas.

Previous ways of solving similar problems have been presented. In GPS Receiver Satellite/Antenna Selection Algorithm for the Stanford Gravity Probe B Relativity Mission, Proceedings of the 1999 National Technical Meeting of the Institute of Navigation Jan. 25-27, 1999 Jie Li, Awele Ndili, Lisa Ward, Saps Buchman, a set of 4 antennas are assigned to 6 channels whereby in each channel 1 satellite is tracked. A master antenna is assigned for each channel for code and carrier tracking. This antenna is chosen as the one which for a given satellite either a) maximizes its SNR b) results in the highest elevation angle being computed with reference to the Satellite. So all antennas may be used in time interleaved fashion with each tracking different satellite(s). In this application, the device containing the GPS receiver is moving so the signal from each antenna is fed to each GPS channel in a time-interleaved fashion so that each channel can continue to track the same satellite signal(s) even while the attitude of the device has changed such that the best antenna for tracking a given GPS satellite signal changes.

Furthermore, several different metrics for antenna selection apart from SNR and satellite elevation are presented. In MIMO system embodiments for wireless systems, capacity based metrics or mean-squared error (MSE) type metrics are employed for antenna selection. Performance Based Receive Antenna Selection for V-BLAST Systems, IEEE TRANSACTIONS ON WIRELESS COMMUNICATIONS, VOL. 8, NO. 1, JANUARY 2009 Di Lu, and Daniel K. C. So These typically involve multiple transmitted signals as well and are numerically complicated techniques which employ matrix inversion, or determinant based computations.

In A Switching Circuit Scheme for a satellite site diversity system, IEEE International Symposium on Circuits and Systems, June 1988, pg 119-122, vol. 1, D. Di Zenobio, P. Lombardi, P. Migliorni, and E. Russo, switched diversity is used to improve satellite tracking by having two antennas separated by very long distances. When the performance of one antenna is suffering from rain attenuation, then the other antenna (which is hopefully not being rained on) can be used. The solution proposed above requires signal quality on both antennas to be monitored continuously.

In Predictive switched diversity for slow speed mobile terminals, M. Tarkiainen, T. Westman, Vehicular Technology Conference, May 1997, pg. 2042-2044 vol. 3, antenna diversity techniques proposed for a TDMA system with discontinuous transmissions are categorized into switching methods, selection methods and combining methods and the two switching strategies given are switch-and-stay and switch-and-examine. A switch-and-stay strategy the antenna is switched once its quality falls below a predetermined threshold, and in a switch-and-examine strategy the receiver is switched rapidly through the antennas until one with a quality above a threshold is found. The gaps in between transmissions provide convenient "quiet intervals" during which antennas can be switched without transients affecting the signal reception.

There is a need for novel antenna switching embodiments for a GNSS receiver which be classified as switch-and-stay or switch-and-examine strategies. In this case, there are no quiet intervals during which antennas may be switched (since no signal is being received). Also in this case, there are multiple signals arriving from multiple transmitters (e.g. satellites) at various different angles simultaneously.

BRIEF DESCRIPTION OF THE DRAWINGS

Reference will now be made to the accompanying drawings wherein.

DETAILED DESCRIPTION

Figure 1A:
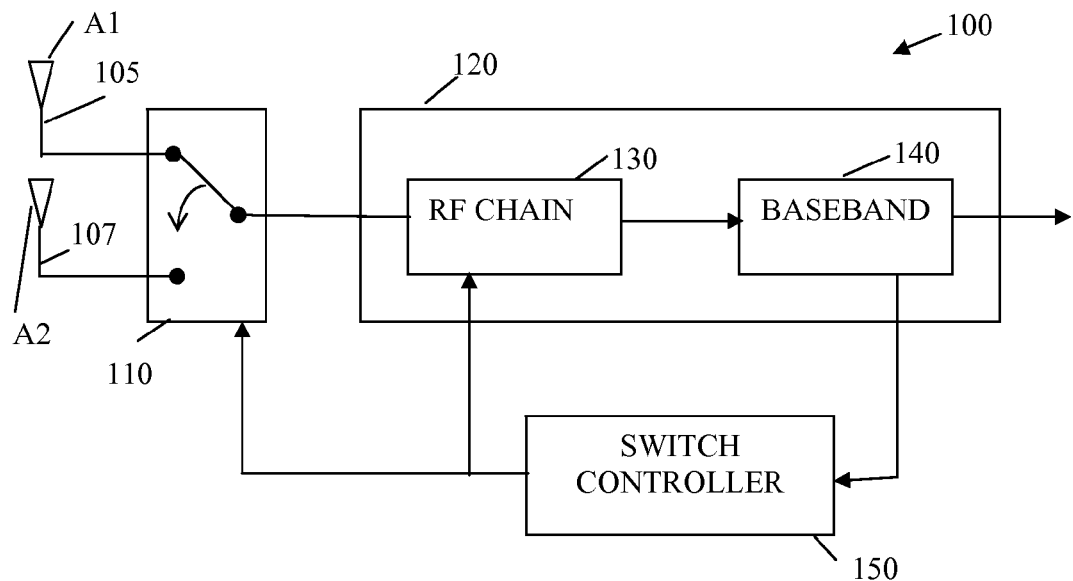
FIG. 1A is a block diagram of a system embodiment.

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention provide novel antenna switching embodiments for a GNSS receiver that can be classified as switch-and-stay or switch-and-examine strategies. They describe how the GNSS receiver can use multiple receive antennas in a low-cost manner to improve performance. The embodiments disclosed herein do not impose the restriction of one-one correspondence between an antenna and a given satellite. The embodiments are unique, inter alia: the antennas are located within the receiving device or within close proximity and the signal quality of each antenna need not be monitored continuously.

Implementation of the embodiments pertains to GNSS receivers where the transmission is continuous. Therefore, there are no intervals without transmissions that can be used to switch or select the antennas. The key to combining antenna switching with a GNSS receiver is to blank out the RF signal while the antennas are switched without losing track of the signals being tracked. In this context, blanking out the signal means that the signal is effectively all zeros.

Another key difference of the methods compared to existing techniques is that the GNSS receiver is processing signals from many different transmitters (satellites). This leads to novel metrics for deciding when to switch antennas. The GNSS receiver itself provides some unique metrics which can also be used to make antenna switching decisions.

In this context a GNSS receiver processes signals from one or more satellite systems such as GPS, Galileo, GLONASS, Iridium, Beidou, QZSS, or SBAS.

In the embodiments, the GNSS receiver has fewer RF chains than receive antennas to keep cost low. (In the preferred embodiment there is only a single RF chain. The descriptions herein are often from the point-of-view of the receiver having a single RF chain, but the embodiments can be easily extended to cases where multiple RF chains are present.) Therefore, the GNSS receiver cannot process data from all its antennas simultaneously. However, there are performance benefits that can be achieved by processing the data from each antenna serially rather than in parallel. One such example is if a user places their GNSS receiver on a metal object such that the antenna underneath the phone suffers from severe attenuation leading to degraded performance. However, if there were a second antenna placed in the phone such that it sees less severe attenuation then the performance could be improved by antenna selection.

Multiple antennas could be mounted on a vehicle and provided to the GNSS receiver as inputs. In some cases one antenna may have better reception so that antenna selection can improve performance. So the antennas are not necessarily co-located within the device containing the GNSS receiver. The antennas could also have different characteristics such as polarization. For example one antenna could be right-hand circularly polarized, and the other could be left-hand circularly polarized, and another could be a linear antenna. The different antennas may also be directional and designed to enhance signals in a different direction. For example, in an application where the GNSS receiver is in a device which is practically always stationary and indoors (like a wireless LAN access point or femto cell) it may be advantageous to install multiple antennas pointing in different directions to enhance signals arriving from different directions to allow the device to process satellite signals even while indoors where attenuation can be significant.

In some embodiments, one or more antennas may be inside the receiving device, and one or more antennas may be external to the receiving device. For example, the receiving device may have an external antenna connection. Embodiments described below can allow the receiver to automatically switch to an external antenna whenever it is connected. In such an embodiment, the receiver will treat the external antenna connection as an antenna. If no antenna is actually connected, then embodiments would automatically choose one of the internal antennas. A practical example would be an external antenna that is installed in a vehicle. When the user is in the vehicle and plugs in the external antenna, the GNSS receiver automatically switches to that antenna if it provides better performance than any of the internal antennas.

The description herein is in the context of GNSS receivers where the transmitters are satellites, but the same concepts can be applied to terrestrial transmitters as well.

Figure 1B:
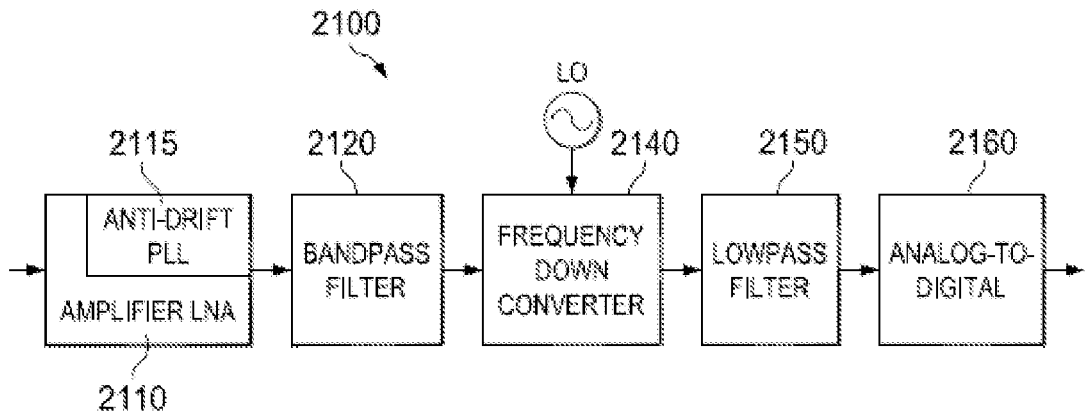
FIG. 1B is a block diagram of a RF chain.

Referring now to FIG. 1A which shows a system in accordance with an embodiment of the invention. The system 100 has five main components comprising multiple receive antennas A1 105 and A2 107, an antenna switch 110, the GNSS receiver 120, and the switch controller 150. The GNSS receiver 120 comprising an RF chain 130 and baseband circuitry 140. Two antennas 105 and 107 are shown for simplicity but more than two may be used. Many GNSS receiver implementations separate a measurement engine (ME) from a position engine (PE). In some cases, the ME and PE are implemented on separate ASICs or processors. For the purposes of this disclosure, it is not important where the GNSS receiver is implemented as long as it accepts the RF signal and provides the output to the switch controller. The switch controller 150 may be in the same place as the ME and/or PE or it may be a separate unit with inputs from both (or either) the ME and PE. The switch controller's 150 main purpose is to provide a control signal to the antenna switch 110 such that the appropriate receive antenna is connected to the RF chain 130 in a timely manner. Similarly, the receiver may have multiple RF chains, but still having more antennas than RF chains. In this embodiment, the switch controller controls multiple switches, but otherwise this embodiment follows the description herein for the case of having one RF chain. The main difference being that once one antenna has been selected for one RF chain, the same decision methods are applied to the remaining antennas to select the best for the next RF chain. While not shown explicitly in FIG. 1A, the blanking operation may be a part of the RF chain 130, so that while the signal is being blanked the effective output of the RF chain 130 is zero. FIG. 1B shows one embodiment of an RF chain, in this case while the antenna switch is being changed and transients are settling down the output of the ND converter would be forced to all zeros. The switch controller would control when the output of the ND converter is forced to all zeros.

FIG. 1B is from U.S. patent application Ser. No. 12/244,060 filed Oct. 2, 2008 entitled POWER-SAVING RECEIVER CIRCUITS, SYSTEMS AND PROCESSES incorporated herein by reference.

In FIG. 1B, the receiver converts the incoming signal to a digital baseband signal using a radio-frequency (RF) chain 2100 coupled to one or more antennas 2105. The RF chain 2100 has a low noise amplifier LNA 2110 and an associated anti-drift phrase lock loop PLL 2115. LNA 2110 is coupled to a bandpass filter 2120 that in turn feeds a frequency down-converter 2140. The frequency down-converter 2140 has a local oscillator LO and a mixer followed by a low pass filter 2150 and an analog-to-digital (A/D) converter 2160. A power saving mode controller 2130 selectively supplies power to any one, some, part or all of bandpass filter 2120, frequency down converter 2140, low pass filter 2150 and A/D converter 2160. Controller 2130 supplies power independently to LNA 2110, anti-drift PLL 2115 and the local oscillator LO in case these blocks are lower cost units with enough warm up drift to justify keeping them powered continually except in a longer-term sleep mode.

From the perspective of the baseband processing 140 in the GNSS receiver 120 the state of the switch does not matter as long as a clean RF signal is delivered. If the RF signal is blanked out until any transients due to switching have died down, then the baseband processing does not need to change or even know that a switching has occurred as long as the blanking interval is short. Here short means relative to the intervals between updates from the GNSS receiver 120. For example, if the GNSS receiver 120 outputs an updated position every 1 sec, then 100 ms could be considered short which is more than sufficient time for a switch to change from one antenna to another. Power-save modes may turn off the RF signal for 90% of the dwell or more—in that context 900 ms is considered short. If the GNSS receiver 120 knows to ignore the signal during the blanked portion, then the blanking interval could be even longer. As a result, the GNSS receiver 120 may continue its normal processing and navigation computations even during dwells where antenna switching has occurred. During a dwell that includes data from multiple antennas the GNSS receiver 120 may either:

1. Compute its output based solely on the data from one antenna.
   a. This will reduce the SNR.
   b. In this case, the GNSS receiver 120 should ignore the data coming from other antennas as if the signal was blanked. This is essentially how the receiver would behave in a power-save mode as is disclosed in U.S. patent application Ser. No. 12/244,060. Except it must compute relevant metrics so that the switch controller can select the appropriate antenna.
2. Process the data from two or more of the antennas as if they came from the same antenna.
   a. There may be a phase difference between the signals coming different antennas, but this will not affect typical GNSS receivers. There would only be an SNR reduction due to the portion of the signal lost while switching antennas.

Since GNSS receivers are robust to the signal being blanked, as evidenced by existing power-save modes, the RF signal can be blanked before and after engaging the switch to minimize the transient effects in switching circuits.

There are several different approaches and configurations for performing the antenna selection and multiple methods for performing antenna selection. For ease of explanation the description below divides the embodiments into cases where two antennas (Nrx=2) are present and for the case where there are more than two antennas (Nrx>2).

As background, the GNSS receiver 120 processes a number of samples during each dwell for each satellite. For a GPS receiver with a 1 sec update rate there are typically 50 samples per second that are processed. Two options for implementing the GNSS receiver 120 are block based processing or loop-based processing. Block-based processing takes all the samples and processes them jointly while loop-based processing processes each sample one at a time. If the input signal is blanked such as during a power-save mode or during intervals where the antennas are switched, then the processing can be adapted to work without all the samples. In this way, there is not disruption in outputs from the GNSS receiver 120.

Even though it has a certain update rate, the GNSS receiver 120 need not use all the samples in its position estimation. For example, a GPS receiver with a 1 sec update rate could compute a position based only on the first 25 samples—basically ignoring the last 25 samples in the dwell. It wouldn't normally do that because the more samples it uses the better it can perform. However, this may be useful to help decide which antenna to select.

Two Antenna Cases

Figure 2:
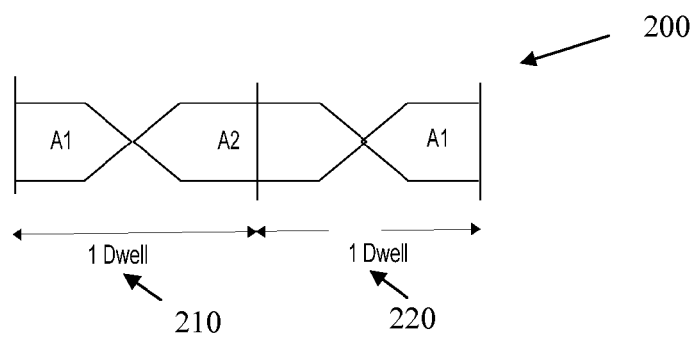
FIG. 2 is a first embodiment of the duty-cycle.

In order to detect when one antenna is better than another antenna, the receiver may periodically (or upon a certain event) toggle the switch and check a metric (such as the signal level, C/No) for all or a subset of the satellites being tracked. The different times or ways a receiver can switch from one antenna to the other are listed below:

Case 1:

FIG. 2 gives a duty-cycle switching example 200 where A1 means the signal from antenna A1 105 is being delivered and A2 means the signal from antenna A2 107 is being delivered. In this case, a portion of each dwell 210 and 220 is dedicated to each antenna, but the duration of each dwell does not need to be the same. One interval could only be long enough to obtain an estimate of the signal level for all or a subset of the satellites being tracked. For the duty-cycle in FIG. 2, the A1 interval is at the beginning in every other dwell to reduce the amount of switching that is required.

Figure 3:
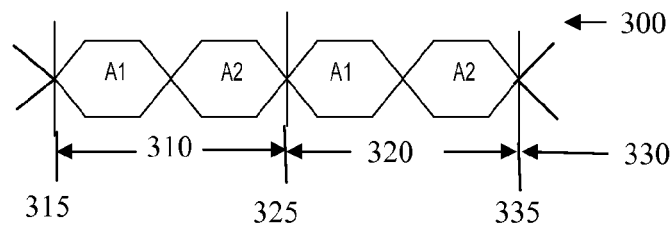
FIG. 3 is a second embodiment of the duty-cycle.

Case 2:

FIG. 3 shows an alternative switching duty-cycle 300 where the A1 interval is always at the beginning 315, 325 and 335 of the dwells 310, 320 and 330 which may be preferable for some implementations. Or in other embodiments, each antenna could be used for a certain number of dwells before switching.

Figure 4:
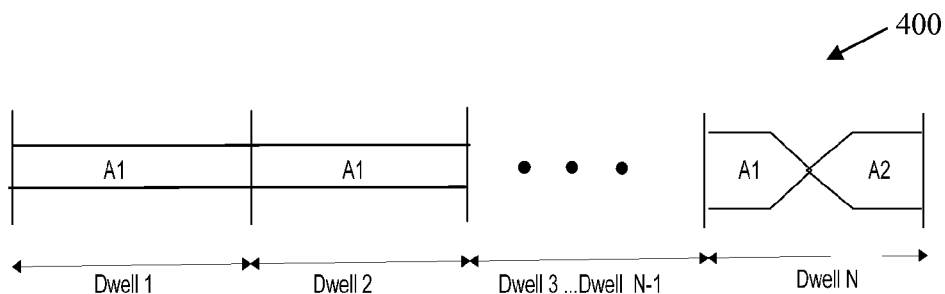
FIG. 4 is a third embodiment of the duty-cycle.

Case 3:

Alternatively, the duty-cycle 400 in FIG. 4 may be used so that the signal level on the other antenna is computed less frequently (not every dwell) to reduce the amount of switching that is required. In one embodiment, the number of dwells (N−1) between switching from one antenna to the other for computing the relevant signal statistics is kept fixed. In other embodiments, the number of dwells between which the signal level is computed in the other antenna is kept adaptive. This type of switching strategy is especially useful in cases where there is system performance degradation due to spurs introduced in the switching process. Hence, if a particular Rx antenna is giving satisfactory performance, there is no need to switch to the second Rx antenna. Several possible metrics to determine whether it is time to switch and check the signal statistics on the second antenna may be defined, these metrics are labeled Signal Quality Metrcs:

1. C/No or SNR or Noise Variance: A GNSS receiver typically requires 4 satellites to get a position fix though less than 4 can be used to propagate a position. One metric is to check if there are at least X-satellites which have C/No or SNR or Noise Variance greater than or less than a predefined threshold. In some embodiments X may be set to 4. A similar method is to compute a function of the signal levels that yields a scalar value such as mean, median, max, min, norm, etc.
   a. C1=mean(C/No on antenna 1 of all SVs being tracked)
   b. C2=mean(C/No on antenna 2 of all SVs being tracked)
2. Pseudo-range uncertainty: In some embodiments, the GNSS receiver may be able to provide a measure of uncertainty for the pseudo-range measurement for each satellite. One metric is to check if at least X-satellites have a pseudo-range uncertainty within a predefined limit. This metric is disclosed in U.S. patent application Ser. No. 12/648,846. Likewise a function of the pseudo-range uncertainties on each antenna can be computed such as mean, median, max, min, norm, etc.

a. C1=mean(pseudo-range uncertainty on antenna 1 of all SVs being tracked)
b. C2=mean(pseudo-range uncertainty on antenna 2 of all SVs being tracked)
3. Pseudo-range residuals: In some embodiments, the GNSS receiver may be able to provide the difference between the measured pseudo-range and the expected pseudo-range (commonly called pseudo-range residuals). One metric for this information is to check if at least X-satellites have a pseudo-range residual within a predefined limit. Likewise a function of the pseudo-range residuals on each antenna can be computed such as mean, median, max, min, norm, etc.
a. C1=mean(pseudo-range residuals on antenna 1 of all SVs being tracked)
b. C2=mean(pseudo-range residuals on antenna 2 of all SVs being tracked)
4. Position/Velocity uncertainty: The GNSS receiver apart from giving a position and a velocity fix may also be able to give position and velocity uncertainties. An alternative metric is to check if the position uncertainty/velocity uncertainty calculated is within a predefined threshold.

The above mentioned signal quality metrics are represented in the flow diagrams as "DecisionMetric(C1, . . . , CNrx)" where C1 represents the metric from the first antenna and CNrx represents the metric from the last antenna. For example, with Nrx=2, C1=C/No metric from the first antenna, and C2=C/No metric from the second antenna.

The above mentioned metrics are in no way restrictive and any combination of the above three may be used to define a suitable condition for switching from one antenna to the other. In some embodiments it may be required for a combination of the above metrics to satisfy some condition (e.g. above or below a threshold) for a fixed period of time before antenna switching is performed.

In other embodiments, the time taken to decide on the best antenna may take more than one dwell. In FIG. 4, that would mean what is shown as the Nth dwell could actually cover multiple dwells.

Case 4:

In some embodiments which are also sensor based, (i.e., they have access to information from one or more sensors such as accelerometers, e-compasses, gyroscopes, digital-cameras, infra-red sensors, light sensors), it is possible to get an idea of the orientation of the antennas and the GNSS device. When a change in the orientation of the GNSS device (and therefore the antennas) is detected, then antenna switching may be performed. As an example assume that the GNSS device has two antennas, one on each side of the GNSS casing.

1. Assume the GNSS device is placed on a car seat or dashboard with the RF antenna currently being used facing downwards. Then using the light sensor/infra-red sensor or digital camera this can scenario can be detected and the second antenna is then used.
2. Alternatively, outputs from any combination of the accelerometer, gyroscope, and e-compass may be used to keep track of the relative orientation of the GNSS receiver. In this case, switching may be performed whenever it is determined that the second antenna is the one that is facing upwards. For example, if the antenna on one side of the handset is deemed the best via antenna selection, then the handset if flipped such that the two antennas effectively trade places sensors can detect this and change antennas automatically.

In Summary, the receiver may perform antenna selection based upon the occurrence of one or more events:
1. A certain amount of time has elapsed since the last antenna selection.
2. A signal quality metric falls below a threshold.
3. A change in the orientation of the GNSS device is detected using sensors.

Figure 8:
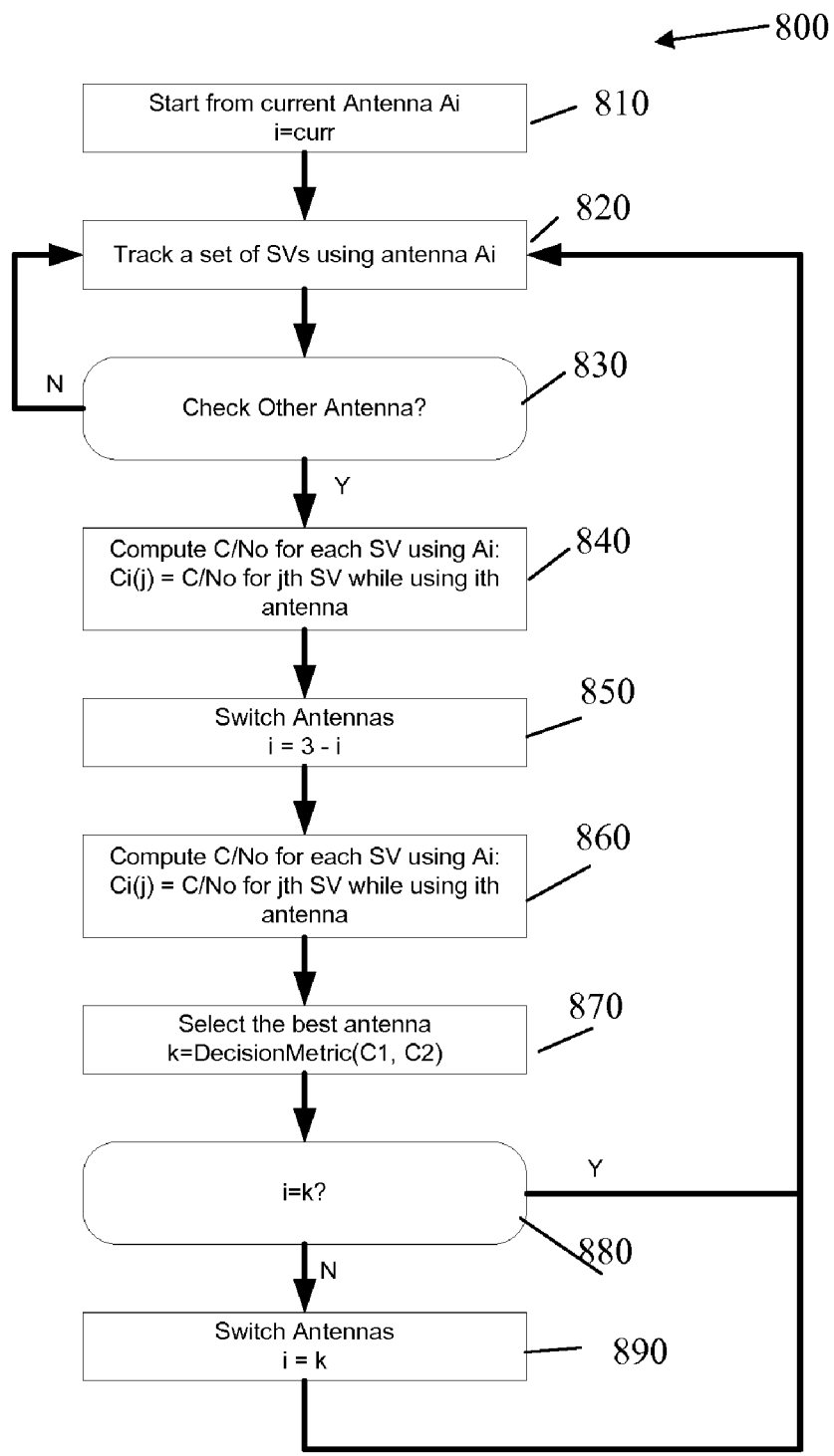
FIG. 8 is a flow diagram for Nrx=2.

FIG. 8 is a flow diagram for Nrx=2. Process 800 starts from the current antenna Ai, where i is index for current antenna 810. A set of satellite vehicles SVs are tracked using the current antenna Ai 820. A decision is made to check other antennas or not 830. The decision block "Check Other Antennas?" 830 may be implemented according to any Case 1, Case 2, Case 3, or Case 4. For example, for cases 1 and 2, if the dwell time may be 1 sec, then the other antenna(s) may be checked every 1 sec. For Case 3, the other antennas may only be checked if the position uncertainty exceeds 10 m or if the time since the last antenna switch exceeds 30 sec. For Case 4, the other antennas may only be checked if the sensors detect a change in orientation. Other embodiments may combine various cases, for example, the other antenna(s) may be checked only if position uncertainty exceeds 15 m or if sensors detect a change in orientation.

Continuing with FIG. 8, if other antennas are not checked, the process is returned to 820. When other antennas are checked, the C/No is computed for each SV (or a subset) using Ai: Ci(j)=C/No for the jth SV while using the ith antenna 840. After switching antennas at 850 by changing index i to 3-i, C/No is computed for each SV using Ai: Ci(j)=C/No for the jth SV while using the ith antenna 860. Antenna selection is performed at 870, in other words the best antenna is selected, another index k is equal to the index of the best antenna according to a decision metric described below. At 880, if i is equal to k, then the process returns to 820. If i is not equal to k, antennas are switched and index i is made equal to k 890. The process is returned to 820.

Figure 9:
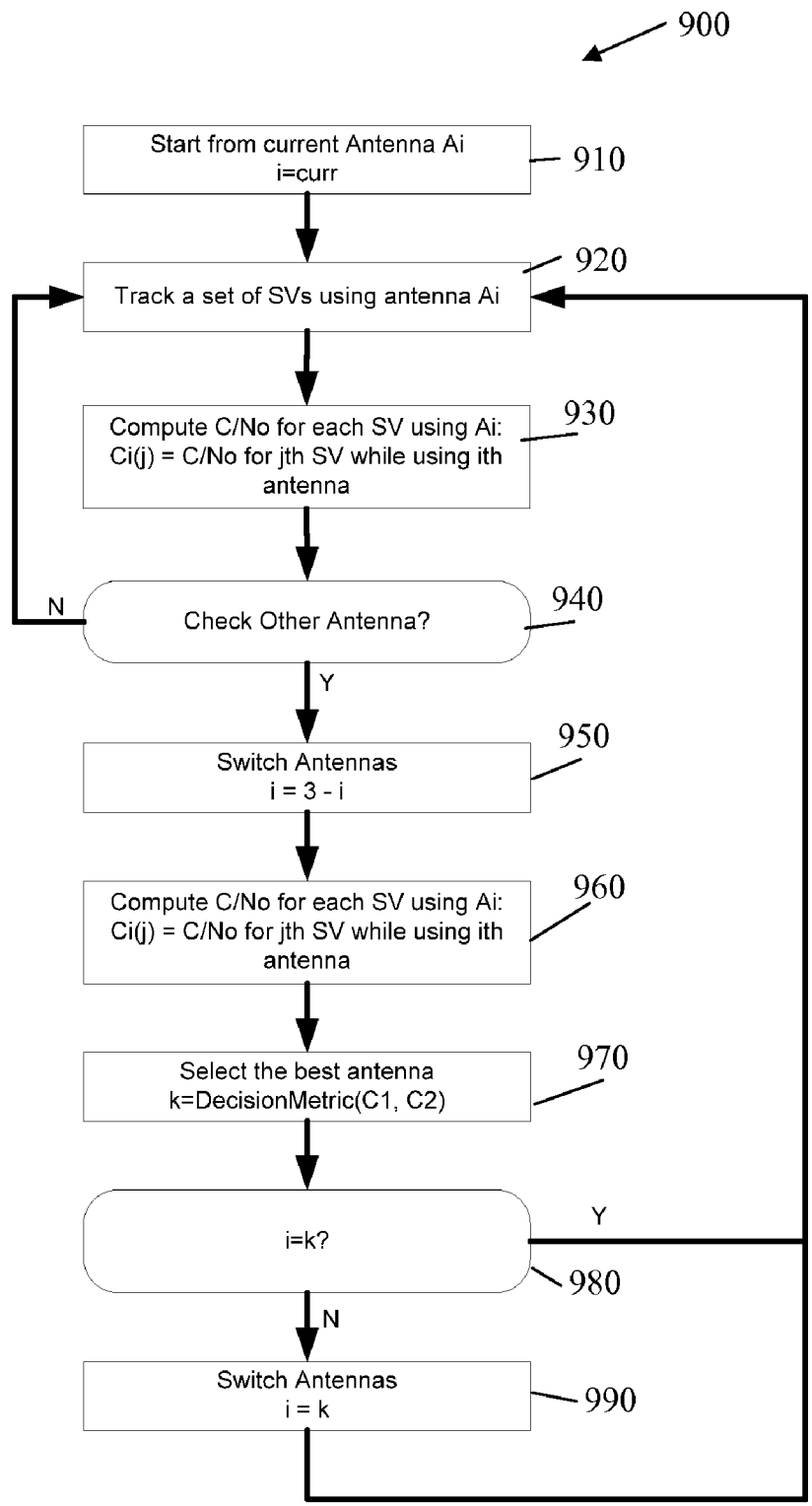
FIG. 9 is an alternative flow diagram for Nrx=2.

FIG. 9 is an alternative flow diagram for Nrx=2. The process 900 starts from the current antenna Ai, where i is index for current antenna 910. A set of satellite vehicles SVs are tracked using the current antenna Ai 920. C/No is computed for each SV using Ai: Ci(j)=C/No for the jth SV while using the ith antenna 930. A decision is made to check other antennas or not 940. The decision block "Check Other Antennas?" 940 may be implemented according to any Case 1, Case 2, Case 3, or Case 4. For example, for cases 1 and 2, if the dwell time may be 1 sec, then the other antenna(s) may be checked every 1 sec. For Case 3, the other antennas may only be checked if the position uncertainty exceeds 10 m or if the time since the last antenna switch exceeds 30 sec. For Case 4, the other antennas may only be checked if the sensors detect a change in orientation. Other embodiments may combine various cases, for example, the other antenna(s) may be checked only if position uncertainty exceeds 15 m or if sensors detect a change in orientation.

Continuing with FIG. 9, if other antennas are not checked, the process is returned to 920. When other antennas are checked, antennas are switched at 950 by changing the index i to 3-i, C/No is computed for each SV using Ai: Ci(j)=C/No for the jth SV while using the ith antenna 960. The best antenna is selected at 970, another index k is equal to a decision metric described below. At 980, if i is equal to k, then the process returns to 920. If i is not equal to k, antennas are switched and index i is made equal to k 990. The process is returned to 920.

In FIG. 8 and FIG. 9, the decision block "Check Other Antennas?" may be implemented according to any Case 1, Case 2, Case 3, or Case 4. For example, for cases 1 & 2 if the dwell time may be 1 sec, then the other antenna(s) may be checked every 1 sec. For Case 3, the other antennas may only be checked if the position uncertainty exceeds 10 m or if the time since the last antenna switch exceeds 30 sec. For Case 4, the other antennas may only be checked if the sensors detect a change in orientation. Other embodiments may combine various cases, for example, the other antenna(s) may be checked only if position uncertainty exceeds 15 m or if sensors detect a change in orientation.

The flow diagram figures show one specific C/No metric being used to drive the decision to check other antennas as well as the decision metric for antenna selection. This is in no way a restriction, and any of the other metrics described above may be used.

Multiple Antenna Cases

Figure 5:
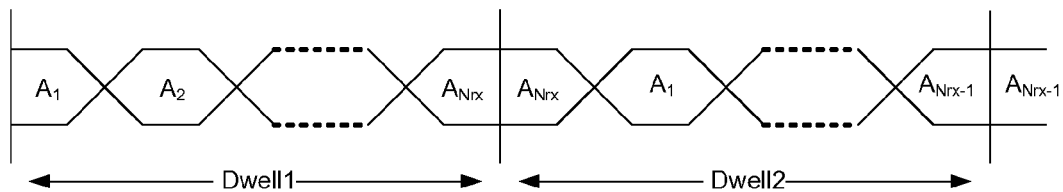
FIG. 5 is a fourth embodiment of duty-cycle for the Nrx>2 antenna case.
Figure 6:
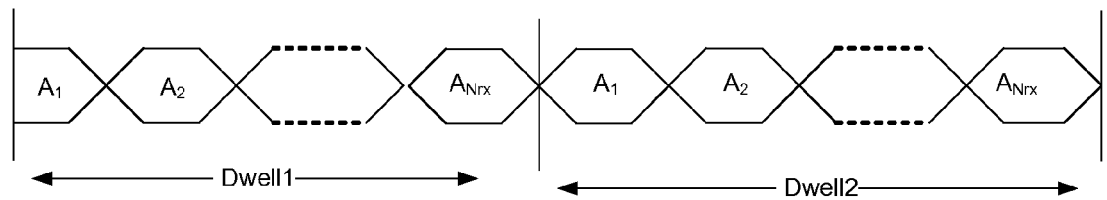
FIG. 6 is a fifth embodiment of duty-cycle for the Nrx>2 antenna case.
Figure 7:
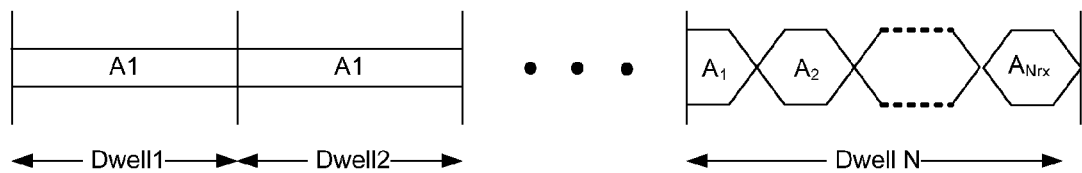
FIG. 7 is a sixth embodiment of duty-cycle for the Nrx>2 antenna case.

The extension of how the duty-cycle is changed from antenna to antenna from the two antenna scenario to the multiple antenna scenario is shown in FIGS. 5, 6, and 7. FIG. 4 is a third embodiment of the duty-cycle. FIG. 5 is a fourth embodiment of duty-cycle for the Nrx>2 antenna case. FIG. 6 is a fifth embodiment of duty-cycle for the Nrx>2 antenna case. FIG. 7 is a sixth embodiment of duty-cycle for the Nrx>2 antenna case Note that this is in no way an exhaustive combination of all approaches. For example in FIG. 6, the ordering in which the antennas are selected in the dwell is kept fixed as ($A_1$, $A_2$, ... $A_{Nrx}$). In some embodiments the search order may be changed from dwell to dwell. This is especially useful if apriori information is available about which antenna is preferable. For example, if in the previous search iteration, an ordered list of metrics for the antennas is already available (i.e., for each antenna the performance wrt to either SNR/CNo/NoiseVariance/Psuedo-range uncertainty/Psuedo-range residuals/Position Uncertianty/Velocity Uncertainty is known), then in the new search iteration, the antenna search may begin with the one which has the best metric followed by the second best and so on. Furthermore, note that all antennas need not always be checked (i.e, if during a search a particular antenna is deemed to provide good enough performance), the search may be terminated and for the set of antennas searched the antenna with the best performance may be chosen. FIG. 9 shows an example flow diagram for this alternative embodiment.

Metrics to Determine Antenna Selection

Once the receiver has decided to check the other antenna(s) to determine which one should be used, it must implement a metric for selecting the best antenna. In the flow diagrams of FIG. 8 and FIG. 9, this metric is computed by the command "i=DecisionMetric($C_1, \ldots, C_{Nrx}$)", where i is the index of the antenna selected and C1, ..., CNrx are the inputs used to make the decision. Nrx is the number of antennas.

Several different approaches exist to determine which antenna to switch to some of which have been outlined in the previous sections. Let $C_i(j)$ be the carrier to noise ratio for the j'th satellite from the i'th antenna and let $C_i=[C_i(1), C_i(2), \ldots, C_i(K)]$ denote the K-tuple vector for C/No's for each antenna. Note that K need not necessarily be the same for each antenna. Let CNothresh denote the minimum CNo required for each satellite. Then let $C_1 = \text{sort}([C_1(1), \ldots, C_1(K_1)])$ $C_2 = \text{sort}([C_2(1), \ldots, C_2(K_2)])$ $C_{Nrx} = \text{sort}([C_{Nrx}(1), \ldots C_{Nrx}(K_{Nrx})],)$ denote the sorted in descending order K-tuple vector of C/No's for each antenna such that each vector only contains those satellite carrier to noise ratios above the threshold CNothresh. These C/No vectors can be used to implement a variety of decision metrics used for antenna selection, not all metrics would require sorting but sorting is still used only for explanation purposes.

1) Use one of several different functions to map each $C_i$, i=1, ... Nrx to a single number Yi. Then the antenna with the largest number Yi is chosen. Some examples of such functions are sum, median, max, min, L1 norm, L2 norm, Lp norm, arithmetic mean, geometric mean, logarithmic mean, the mean of taking the exponential for each element in the vector $C_i$, etc. In some embodiments the smallest Yi may be deemed the best.
   a. for example Yi=sum of each element in $C_i$.
2) An alternative approach is to choose the antenna with the longest $C_{Nrx}$ ie., the most number of satellites with C/No above a threshold. If there are multiple antennas satisfying this criterion then anyone of the tests in approach 1) above maybe used to break the tie.
   a. i=index of $C_i$ with the most elements.
3) Compare the M-th biggest C/No for each satellite. If C1(M)>C2(M) then antenna one is preferred over antenna 2.
4) The GNSS receiver can also compute a position estimate from each antenna's data separately, then the position uncertainties resulting from each antennas are compared. The antenna with the least uncertainty would be preferred.
5) A third approach is to first compute Yi for each antenna as in approach 1), 3) or 4). Let Ycurr denote the figure of merit for the current antenna used by the GNSS receiver for positioning purposes. Even if there is a Yi, such that Yi>Ycurr for i≠curr, the current antenna may still be used as long as Yi−Ycurr<threshold. In other words, the expected improvement from switching antennas must exceed a minimum amount before it outweighs the cost of switching.
6) Based on sensor input as explained in Case 4 in the previous section, the antenna which is facing skywards or the one with the best satellite visibility is chosen. This is particularly useful if the antennas are directional so that they amplify signals coming from different directions.

Figure 10:
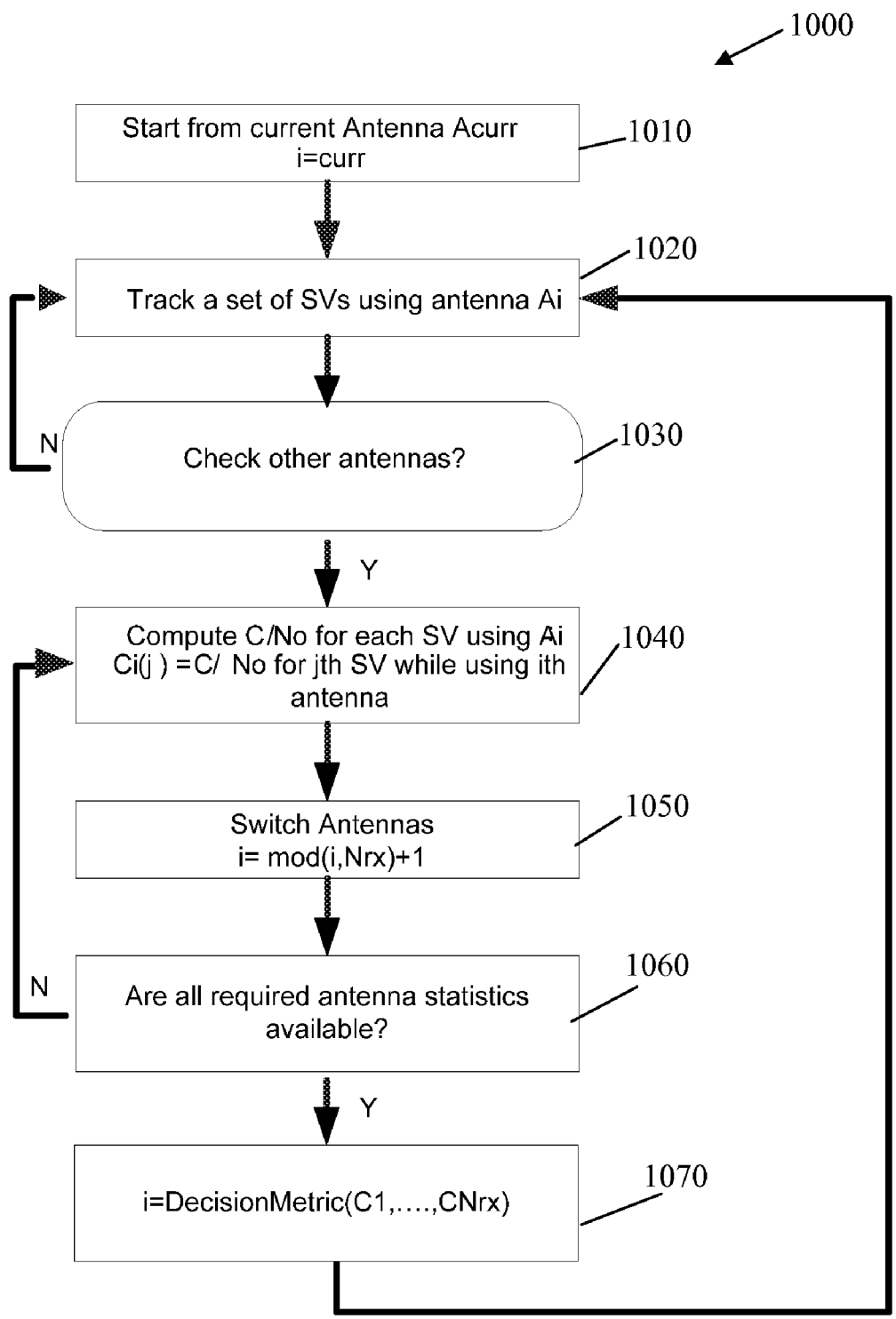
FIG. 10 is another example flow diagram.

FIG. 10 is another example flow diagram. Process 1000 starts from the current antenna Ai, where i is index for current antenna 1010. A set of satellite vehicles SVs are tracked using the current antenna Ai 1020. A decision is made to check other antennas or not 1030. If other antennas are not checked, the process is returned to 1020. When other antennas are checked, the C/No is computed for each SV using Ai: Ci(j)= C/No for the jth SV while using the ith antenna 1040. Switching antennas are done at 1050 by changing index by adding 1 to the modulus of i and Nrx. A decision is made if all required antenna statistics are available 1060. If all required antenna statistics are not available, the process is returned to 1040. If all required antenna statistics are available. Change index i based on a decision metric considering $C_1$ to CNrx 1070. The process is returned to 1020.

Figure 11:
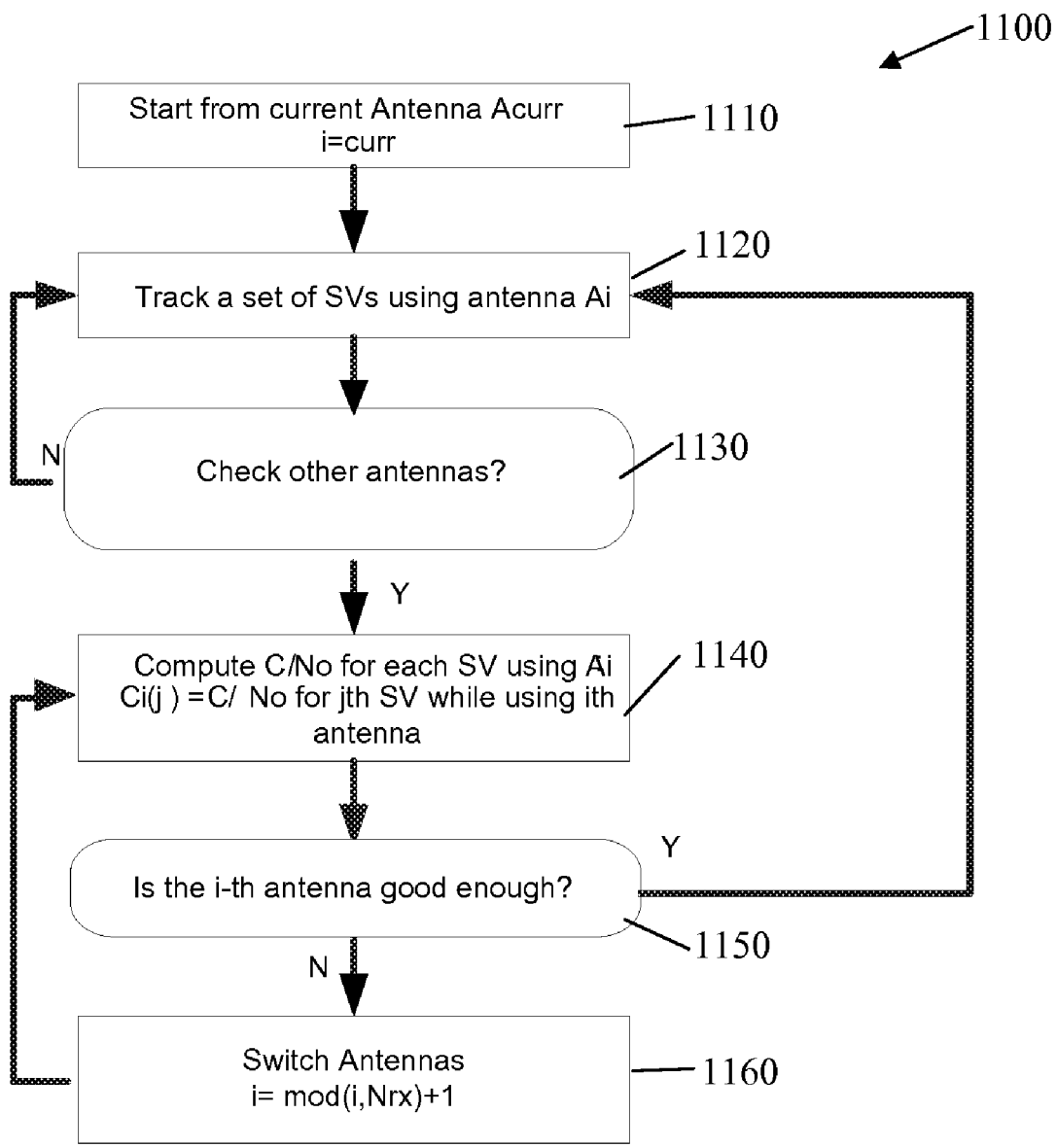
FIG. 11 is yet another example flow diagram.

FIG. 11 is yet another example flow diagram. Process 1100 starts from the current antenna Ai, where i is index for current antenna 1110. A set of satellite vehicles SVs are tracked using the current antenna Ai 1120. A decision is made to check other antennas or not 1130. If other antennas are not checked, the process is returned to 1120. When other antennas are checked, the C/No is computed for each SV using Ai: Ci(j)= C/No for the jth SV while using the ith antenna 1140. A decision is made if the i-th antenna is good enough according to one of the decision metrics described above, for example if the $4^{th}$ largest SNR exceeds a threshold 1150. If the i-th antenna is good enough, the process is returned to 1120. If not, switching antennas is done at 1060 by changing the index by adding 1 to the mod of i and Nrx. The process is returned to 1140.

The embodiments described above referred to the case when SVs are being tracked by the GNSS receiver. In other embodiments the GNSS receiver may not yet have acquired (or found) any SV signals. For example, this is the typical situation when the GNSS receiver is first turned on. Some of the embodiments already described can be applied to this use case as well. Specifically, the GNSS receiver may quickly scan for satellite signals on each antenna and select the best antenna using one of the decision metrics described above. It may also choose the first antenna that is deemed good enough according to one of the decision metrics described above.

the GNSS receiver can try to acquire satellite signal using one antenna, then if it cannot do so within a pre-defined time interval switch to another antenna and try again.

Another employment of the above described embodiments is to detect multipath corrupted signals. For example, if one antenna is right-hand circularly polarized (RHCP) so that it matches the polarization of the line-of-sight (LOS) signal, and another antenna is left-hand circularly polarized (LHCP) so that it matches the polarization of reflections of the LOS signal. Then the signal from the LHCP antenna will yield a larger SNR measurement for reflected signals than the RHCP antenna. So if the SNR for a particular SV is higher coming from the LHCP antenna than its SNR measured from the RHCP antenna it can be marked as a reflection. This information can be passed to the GNSS processing algorithms (measurement engine and/or position engine) to improve their performance.

In some embodiments the satellite may be transmitting multiple signals. For example, GPS satellites transmit signals on multiple frequencies. In the case that the GNSS receiver can process signals from both frequency bands there are some unique embodiments that can be applied. First, it may be beneficial to only process the signal from the frequency band which gives the best performance. For this embodiment, from the point-of-view of the antenna selection described herein the signals in each frequency band can be assumed to be coming from two different satellites. In this case, the antennas being chosen from may be tuned for different frequencies. In this case, either the RF chain is flexible to process signals from both frequency bands or two different RF chains exist within the device for each frequency band—conceptually this is still counted as one RF chain in this disclosure. Second, if the GNSS receiver intends to process signals from both frequency bands simultaneously the signal quality metrics from both frequency bands should be considered when making the antenna selection decision. In this case, it may be that there is an RF chain designed for each frequency band so that the antenna selection described herein can be applied independently for the two frequency bands such that each RF chain could be connected to the same or different antennas. In this case the GNSS receiver could be thought of as two independent co-located GNSS receivers.

The approaches explained above are by no means restrictive and any combination of them can be used. In some embodiments, instead of using the C/No, the SNR may be used, or any pseudo-range uncertainty such as the pseudo-range residuals.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system comprising:
   at least two antennas;
   at least one radio frequency RF chain, wherein there are fewer RF chain(s) than antennas;
   a receiver for processing one or more signals from one or more transmitters that are not co-located;
   at least one antenna switch for antenna switching; and
   at least one switch controller operable to provide signal blanking during antenna switching using different antenna selection metrics and different signal quality metrics.

2. The system of claim 1, wherein the at least two antennas have different characteristics.

3. The system of claim 1, wherein the at least two antennas have the same characteristics.

4. The system of claim 2, wherein the different characteristics are selected from the group consisting of internal versus external, right-hand circularly polarized RHCP/left-hand circularly polarized LHCP, directional, or tuned to different frequencies.

5. The system of claim 1, further comprising a plurality of sensors.

6. The system of claim 1, wherein the number of antennas is two and the number of RF chains is one.

7. The system of claim 1, wherein the least one antenna switch is external to an integrated circuit (IC) where the RF chain(s) resides.

8. The system of claim 1, wherein the at least one switch controller is implemented in a processor operable to signal the RF chain(s).

9. The system of claim 1, wherein the at least one switch controller is implemented in a processor operable to signal RF chain(s) and switch directly.

10. The system of claim 1, wherein the at least one switch controller is implemented in a processor operable to signal the RF chain(s) and switch indirectly.

* * * * *